United States Patent
Kumar et al.

(10) Patent No.: US 10,956,361 B2
(45) Date of Patent: Mar. 23, 2021

(54) PROCESSOR CORE DESIGN OPTIMIZED FOR MACHINE LEARNING APPLICATIONS

(71) Applicant: INTERNATIONAL BUSINESS MACHINES CORPORATION, Armonk, NY (US)

(72) Inventors: Manoj Kumar, Yorktown Heights, NY (US); Pratap C. Pattnaik, Yorktown Heights, NY (US); Kattamuri Ekanadham, Mohegan Lake, NY (US); Jessica Tseng, Fremont, CA (US); Jose E. Moreira, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/205,211

(22) Filed: Nov. 29, 2018

(65) Prior Publication Data
US 2020/0174965 A1    Jun. 4, 2020

(51) Int. Cl.
*G06F 15/80*     (2006.01)
*G06F 12/1072*    (2016.01)
*G06N 20/00*     (2019.01)

(52) U.S. Cl.
CPC ...... *G06F 15/8084* (2013.01); *G06F 12/1072* (2013.01); *G06N 20/00* (2019.01); *G06F 15/8092* (2013.01)

(58) Field of Classification Search
None
See application file for complete search history.

(56) References Cited

U.S. PATENT DOCUMENTS

| | | | | |
|---|---|---|---|---|
| 5,768,609 A | * | 6/1998 | Gove | G06F 15/17375 712/11 |
| 5,958,047 A | * | 9/1999 | Panwar | G06F 9/30094 711/145 |
| 6,389,478 B1 | * | 5/2002 | Blackmore | H04L 29/06 709/236 |
| 7,017,028 B2 | * | 3/2006 | Ben-David | G06F 12/0207 711/217 |
| 7,499,353 B2 | | 3/2009 | Kim | |
| 8,307,194 B1 | * | 11/2012 | Scott | G06F 12/0862 712/34 |
| 9,412,473 B2 | | 8/2016 | Chung | |

(Continued)

OTHER PUBLICATIONS

Cuesta, Blas etal., Increasing the effectiveness of Directory Caches by Deactivating Coherence for Private Memory Blocks. ACM, ISCA'11 Jun. 4-8, 2011, pp. 93-103. (Year: 2011).*

(Continued)

*Primary Examiner* — Eric Coleman
(74) *Attorney, Agent, or Firm* — Intelletek Law Group, PLLC; Gabriel Daniel, Esq.

(57) ABSTRACT

A computing system includes a plurality of functional units, each functional unit having one or more inputs and an output. There is a shared memory block coupled to the inputs and outputs of the plurality of functional units. There is a private memory block assigned to each of the plurality of functional units. An inter functional unit data bypass (IFUDB) block is coupled to the plurality of functional units. The IFUDB is configured to route signals between the one or more functional units without use of the shared memory block.

20 Claims, 10 Drawing Sheets

(56) References Cited

U.S. PATENT DOCUMENTS

| | | | |
|---|---|---|---|
| 9,606,913 B2 | 3/2017 | Moschopoulos et al. | |
| 9,620,176 B2 | 4/2017 | Wu et al. | |
| 9,666,300 B2 | 5/2017 | Zhang et al. | |
| 9,805,816 B2 | 10/2017 | Jan et al. | |
| 9,905,309 B2 | 2/2018 | Bang et al. | |
| 2006/0224838 A1* | 10/2006 | Blumrich | G06F 12/0831 |
| | | | 711/146 |
| 2015/0019835 A1* | 1/2015 | Anderson | G06F 9/3853 |
| | | | 712/3 |
| 2016/0224465 A1* | 8/2016 | Morad | G06F 9/3887 |
| 2016/0276042 A1 | 9/2016 | Pesavento et al. | |
| 2016/0378476 A1* | 12/2016 | Bradbury | G06F 9/3834 |
| | | | 712/225 |
| 2017/0116154 A1* | 4/2017 | Palmer | G06F 9/54 |
| 2017/0177338 A1* | 6/2017 | Gschwind | G06F 9/4812 |
| 2017/0337985 A1 | 11/2017 | Borah et al. | |
| 2018/0047736 A1 | 2/2018 | Seo et al. | |
| 2018/0108425 A1 | 4/2018 | Lee et al. | |
| 2018/0137928 A1 | 5/2018 | Qiu et al. | |

OTHER PUBLICATIONS

List of IBM Patents or Applications Treated as Related.

\* cited by examiner

400A

```
While f ≠ 0 {
    f" = f × A         // current frontier of nodes
    notP = ! p         // p is set of visited nodes
    f' = f" & notP     // f is now next frontier
    p' = p | f' rD = replicate (d)
    D' = copy (rD, f)  // D is depth of visited nodes
    d' = d + 1 ;       // d is depth of current frontier
}
```

PROCESSOR CORE DESIGN OPTIMIZED FOR MACHINE LEARNING APPLICATIONS

BACKGROUND

Technical Field

Embodiments of the present disclosure generally relate to memory technology, and more particularly, to improved communication architectures between functional units and memory of a processor.

Description of the Related Art

Today, processors use different types of memory, including primary storage and secondary storage. A processor interacts closely with primary storage, sometimes referred to as main memory, for both instructions and data. A processor's memory may hold data temporarily (e.g., at the time the computer is executing a program). Secondary storage may hold permanent or semi-permanent data on some external medium, such as a solid-state drive, magnetic drive, optical medium, etc. Computer architectures include caches, which are smaller, faster memories that are between the CPU and the main memory. Having caches provides improvement in speed to the extent the cache stores data that the processor is to process. Cache is generally much smaller than the main memory and can therefore not store all of main memory. The cache regularly evicts out information about memory locations to make space for new data. A processor receives a speedup from the cache if the data to be fetched from memory is still in the cache when it is accessed again.

SUMMARY

According one embodiment, a computing system is provided that includes a plurality of functional units, each functional unit having one or more inputs and an output. There is a shared memory block coupled to the inputs and outputs of the plurality of functional units. There is a private memory block assigned to each of the plurality of functional units.

In one embodiment, there is an inter functional unit data bypass (IFUDB) block coupled to the plurality of functional units. The IFUDB is configured to route signals between the one or more functional units without use of the shared or private memory blocks.

In one embodiment, the shared memory block includes one or more shared vector registers and the private memory block includes a plurality of private vector registers.

In one embodiment, the private vector registers and the shared vector registers each have a same number of elements. Each functional unit can process one element at a time in each clock cycle.

In one embodiment, each of the private vector registers is configured to load all elements of a shared vector register in one clock cycle in parallel, and to store all its elements in a shared vector register in one clock cycle in parallel.

In one embodiment, there is a control unit configured to receive an operation sequence from a program and send control signals to at least one of the one or more functional units, the private registers, and the IFUDB to orchestrate the routing of signals between the one or more functional units, without use of the shared or private memory blocks, based on the operation sequence.

In one embodiment, the IFUDB is a multistage rearrangeable non-blocking type network that can establish different permutations of its connections between its inputs and outputs.

In one embodiment, the IFUDB is configured to forward results from one functional unit to another functional unit of the plurality of functional units, without use of the shared or private register blocks and without waiting for all elements of a vector register to be computed.

In one embodiment, each private memory block includes a mask vector register, an output private vector register, and one or more input private vector registers. The shared memory block includes one or more shared vector registers. The input and output private vector registers each have a same number of elements as the shared vector registers.

In one embodiment, a method of processing data is provided. A first vector register having N elements is loaded from a vector register block that is shared between a plurality of functional units of a processor, in parallel, into a private vector register of a first functional unit of the plurality of functional units, in a first clock cycle. Each of the N elements of the private vector register is processed by the functional unit, in series, on different clock cycles. An output of the first functional unit is routed to a second functional unit via an inter functional unit data bypass (IFUDB) block, without using the shared or private vector register blocks.

In one embodiment, the output of the first functional unit is routed to the second functional unit at a clock cycle before completing the processing of all of the N elements of the private vector register of the first functional unit.

In one embodiment, a third vector register is loaded from the vector register block that is shared between the plurality of functional units of the processor, in parallel, into a second private vector register of the second functional unit, in the first clock cycle.

In one embodiment, an output of the first functional unit is stored to a shared vector register in one clock cycle, in parallel, upon processing the N elements of the private vector register.

In one embodiment, the processing of the N elements of the private vector register is on consecutive clock cycles.

In one embodiment, a second vector register is loaded from the vector register block that is shared between the plurality of functional units of the processor, in parallel, into a second private vector register of the first functional unit, in the first clock cycle.

In one embodiment, processing each of the N elements of the private vector register by the functional unit includes, for each of the N elements, determining whether the first functional unit is to perform an operation, based on a mask vector register.

In one embodiment, the mask vector register is loaded in the first clock cycle.

In one embodiment, the private vector registers and the shared vector registers each have a same number of elements.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
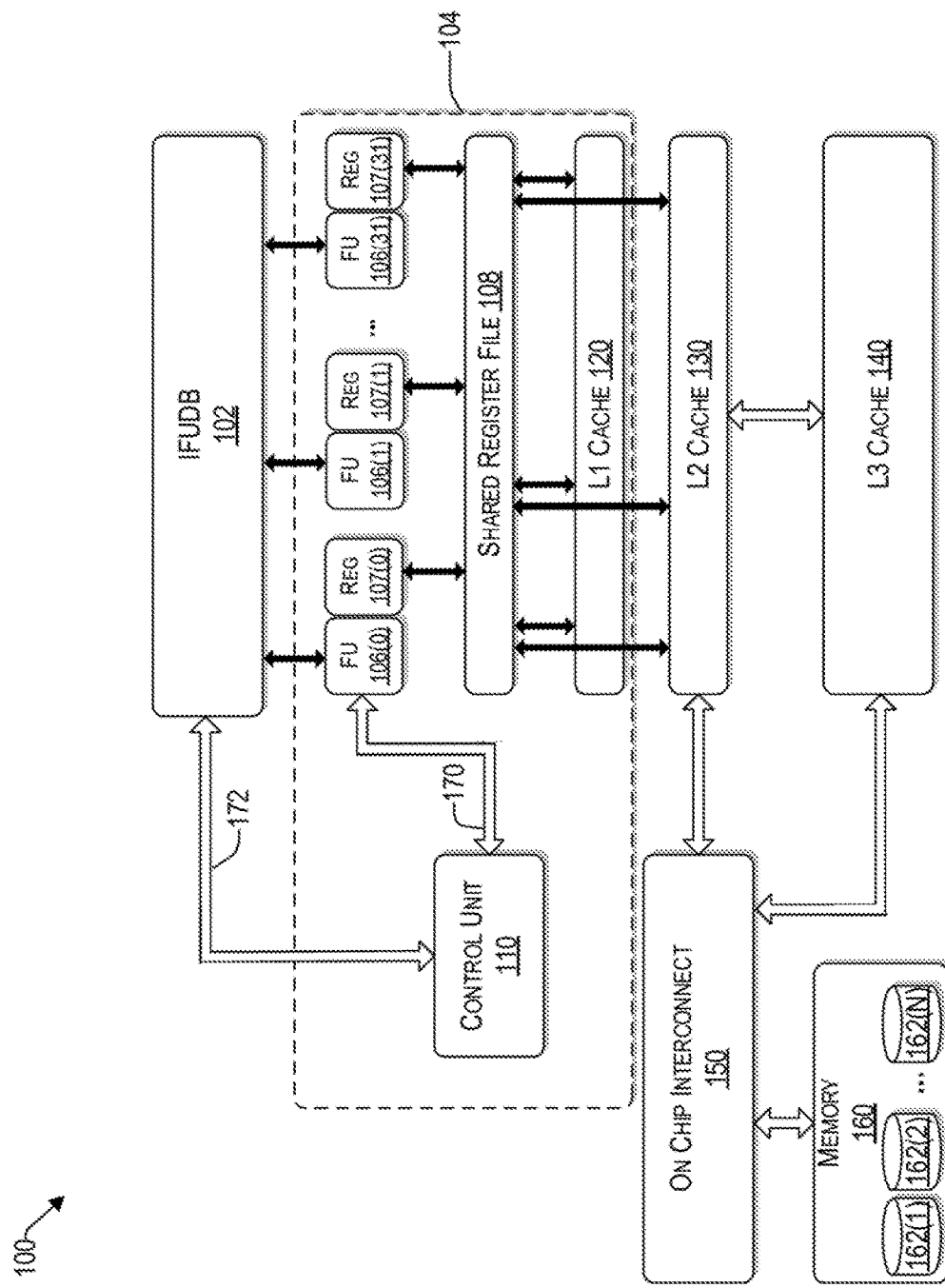
FIG. 1 is a block diagram of a computer system, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to improved architecture between functional units of a processor and memory. In recent years, matrix vector operations have become increasingly important in machine learning and deep computing applications. Such computing applications often include sequences, wherein the result of one operation feeds to the next to provide a final result. Typically, processors perform such operations by way of one or more functional units. Functional units are part of a central processing unit (CPU) and can perform the operations and calculations as instructed by a computer program or algorithm. A functional unit can be an arithmetic logic unit (ALU), address generation unit (AGU), floating-point unit (FPU), load-store unit (LSU), branch execution unit (BEU), etc., or a combination of several such units. Functional units can perform arithmetic and logic operations, as well as load/store operations.

A processor can have multiple function units, which may include one or more for integer and one or more for floating point operations. Known functional units typically receive their inputs from a shared register block and return their results to the shared register block. Accordingly, to perform a sequence of computational operations, a processor would have one or more functional units access a register file between each pair of operations to get input operands for the second operation and store back the result of the first operation, which is inefficient in terms of circuitry used and power spent and contributes to latency. Known processor architectures can be subject to pipeline stalls, where a result of one operation of a functional unit, including load operations that fetch data from memory, is not ready for a subsequent operation by another functional unit.

For example, latency and bandwidth between a processor and memory is often a significant performance bottleneck in cognitive applications that include analysis of large social graphs, or training of neural networks when the weight matrices are sparse. Large social graphs are represented as adjacency matrices. Similarly, machine learning models may involve large sparse matrices. Big data, which may use middleware such as Hadoop, spark, etc., "shuffle" operations and data warehouse join operations sort large arrays of data. Such matrix vector operations include repeated sequences of instructions, where the result of one instruction feeds to the next (i.e., is an input to a next calculation) to obtain a final result. As the number of lanes (i.e., functional units) are widened in the processor core, salient bottlenecks include the bandwidth to the shared register block and inability to dispatch a sufficient number of instructions to keep all the functional units of a core busy.

In one aspect, methods and architectures are discussed herein that provide a more efficient communication between functional units, and between functional units and memory. To that end, each functional unit is assigned a corresponding vector register block that is configured to improve the performance of a processor, as will be described in more detail below.

A salient feature to enhance performance of computations discussed herein is the orchestration of the flow of data through various functional unit operations with minimum latencies in the transfers. By virtue of avoiding shared intermediate storage and providing maximal operation on the data while it resides inside the processor, computational efficiency, in terms of throughput, are improved.

FIG. 1 is an example computer system 100, consistent with an illustrative embodiment. The system 100 includes a processor core 104 that includes a control unit 110. There is external memory 160 that can include one or more memory modules 162(1) to 162(N). In some embodiments, there is a level 2 cache (130) and a level 3 cache (140). There is an on-chip interconnect 150 that couples the external memory 160 to the level 2 and 3 caches (130 and 140).

The memory 160 represents main memory that is external to the core 104. The main memory 160 may be dynamic random-access memory (DRAM), non-volatile random-access memory (NVRAM), etc. For example, data stored in the memory 160 can be accessed via an on-chip interconnect 150 that may transfer the data to a level 2 or 3 cache 130, 140, which can be read by the core 104 via a shared register block 108. Due to its relatively remote location (i.e., not part of the core 104 but via on chip interconnect 150, accessing information from the main memory 160 by the core 104 is more time consuming than that of L1 cache 120, L2 cache 130 or L3 cache 140.

For faster operation, the system 100 includes various caches, which are smaller, faster memories that are coupled between (or part of) the core 104 and the secondary memory 160. In various embodiments, there may be several levels of cache. For example, the primary L1 cache 120 may be the fastest cache and is therefore part of the core 104 of the processor. There may be an L2 cache 130, which may be larger but slower than the L1 cache 120. There may be a tertiary (L3) cache 140 or a fourth level cache (L4—not shown), which may be on a same chip as the core 104 or separate therefrom.

There is a control unit 110 coupled (170) to the functional units 106(0) to 106(31) in the processor core 104 and to (172) an inter functional unit data bypass (IFUDB) block 102. In one embodiment, the control unit 110 includes circuitry that uses electrical signals to direct the entire computer system 100 to carry out, or execute, stored program instructions. The control unit 110 does not execute program instructions; rather, it directs other parts of the system 100 to do so. The control unit 110 stages data from the shared register block into private vector registers 107(0) to 107(31). Thus, it can perform the functions of the instruction fetch unit (IFU) and an instruction sequencing unit (ISU). The control unit 110 is operative to orchestrate the forwarding of the output of one functional unit (FU) to another register file (i.e., without the use of the shared register block 108). The interaction between functional units 106(0) to 106(31) and private vector registers 107(0) to 107(31) is discussed in more detail below.

The IFUDB block 102 is configured to forward results from the output of one functional unit to the input of another functional unit, without the use of the private register blocks 107(0) to 107(31) or the shared register block 108, and without waiting for all elements of a vector register to be computed. For example, the output of functional unit 106(0) can be received by the IFUDB block 102 and routed directly to functional unit 106(1) without going through the private registers 107(0) or 107(1) or the shared registers 108. Significantly, the shared register block 108 need not be used, thereby improving the performance of the processor core 104, which will be explained in more detail later. Accordingly, in addition to or instead of the outputs of a functional unit going to the private register of the functional units, the IFUDB block 102 is configured to connect an output of a functional unit directly to the input(s) of one or more functional units.

The IFUDB block 102 can be implemented in several ways. For example, it may be a multi-stage network unit inside or next to the processor core 104 and operative to connect some or all functional units 106(0) to 106(31) and transfer packets of data to specified destination units, which may be another functional unit. Alternatively, or in addition, the IFUDB block 102 may be a multi-bus controller that can facilitate the transfer of packets between one or more functional units 106(0) to 106(31) and/or between one or more functional units. In various embodiments, the IFUDB block 102 can be embodied in hardware, in software, or a combination thereof.

The core 104 can read and execute program instructions, such as move, add, and/or branch data. The core 104 may include a shared register block 108, which temporarily holds data taken from or about to be sent to memory (e.g., L1 cache 120 and/or L2 cache 130). In some embodiments, the core 104 may be part of a multi-core processor. The shared register block 108 may be both scalar or vector. The core 104 includes one or more functional units (e.g., 106(0) to 106(31)), each configured to perform fixed and floating-point operations in vector mode. Each functional unit may have its own arithmetic logic unit (ALU), address generation unit (AGU), floating-point unit (FPU), load-store unit (LSU), branch execution unit (BEU), etc. Thus, functional units 106(0) to 106(31) can perform arithmetic and logic operations, as well as load/store operations. By way of example only, and not by way of limitation, FIG. 1 includes 32 functional units 106(0) to 106(31), while it will be understood that other configurations, such as 16, 64, 128, etc., are supported as well.

Each functional unit is paired to a corresponding private vector register block that is proximal thereto. For example, functional unit 106(0) is paired to a private (i.e., dedicated) register block 107(0); functional unit 106(1) is paired to a private vector register block 107(1); and so on. Each private vector register can be accessed by its corresponding functional unit, but not directly accessed by other functional units. In contrast, as mentioned previously, the shared register block 108 can be accessed by all functional units 106(0) to 106(31). By virtue of each functional unit having its own one or more private vector registers, data can be processed more efficiently by the functional units 106(0) to 106(31), as will be discussed in detail later.

A register from a private vector register block can be read sequentially by the arithmetic and logic portion of the functional unit and in parallel by the load/store portion of the functional units. Each vector register of a private vector register block is dedicated to either an input or an output port of an arithmetic/logic functional unit. In various embodiments, the operation of the arithmetic and logic unit functional units (e.g., 106(0) to 106(31) and that of the IFUDB block 102 can be either asynchronous or synchronous and is managed by the control unit 110. In one embodiment, the private vector registers 107(0) to 107(31) are "architecturally invisible" in that programs using the processor core 104 need not be altered in order to benefit from the features discussed herein.

Figure 2:
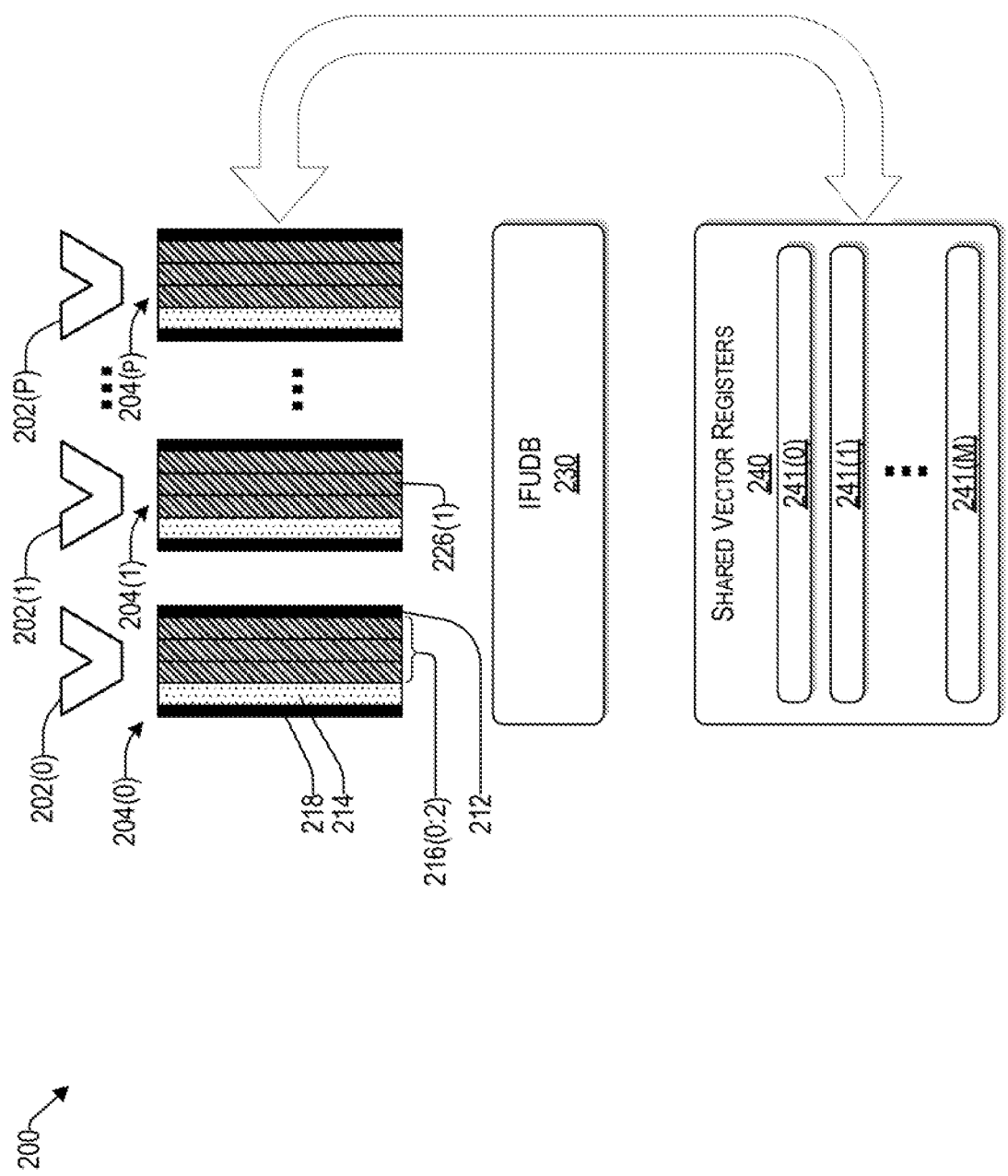
FIG. 2 is a conceptual block diagram of a computing system having a processor that has a private vector register block for each functional unit, consistent with an illustrative embodiment.

Reference now is made to FIG. 2, which is a conceptual block diagram of a computing system 200 having a processor that has a private vector register block for each functional unit, consistent with an illustrative embodiment. The processor has a plurality of functional units 202(0) to 202(P), sometimes referred to herein as ALU's. The number of functional units may be 32, 64, or any other suitable number based on the computing architecture implemented. Each functional unit has a private vector register block that is dedicated thereto. For example, functional unit 202(0) is paired to a private vector register block 204(0); functional unit 202(1) is paired to a private vector register block 204(1); and so on. A functional unit can have multiple inputs. In one embodiment, three vector operands are accepted per input.

Figure 3:
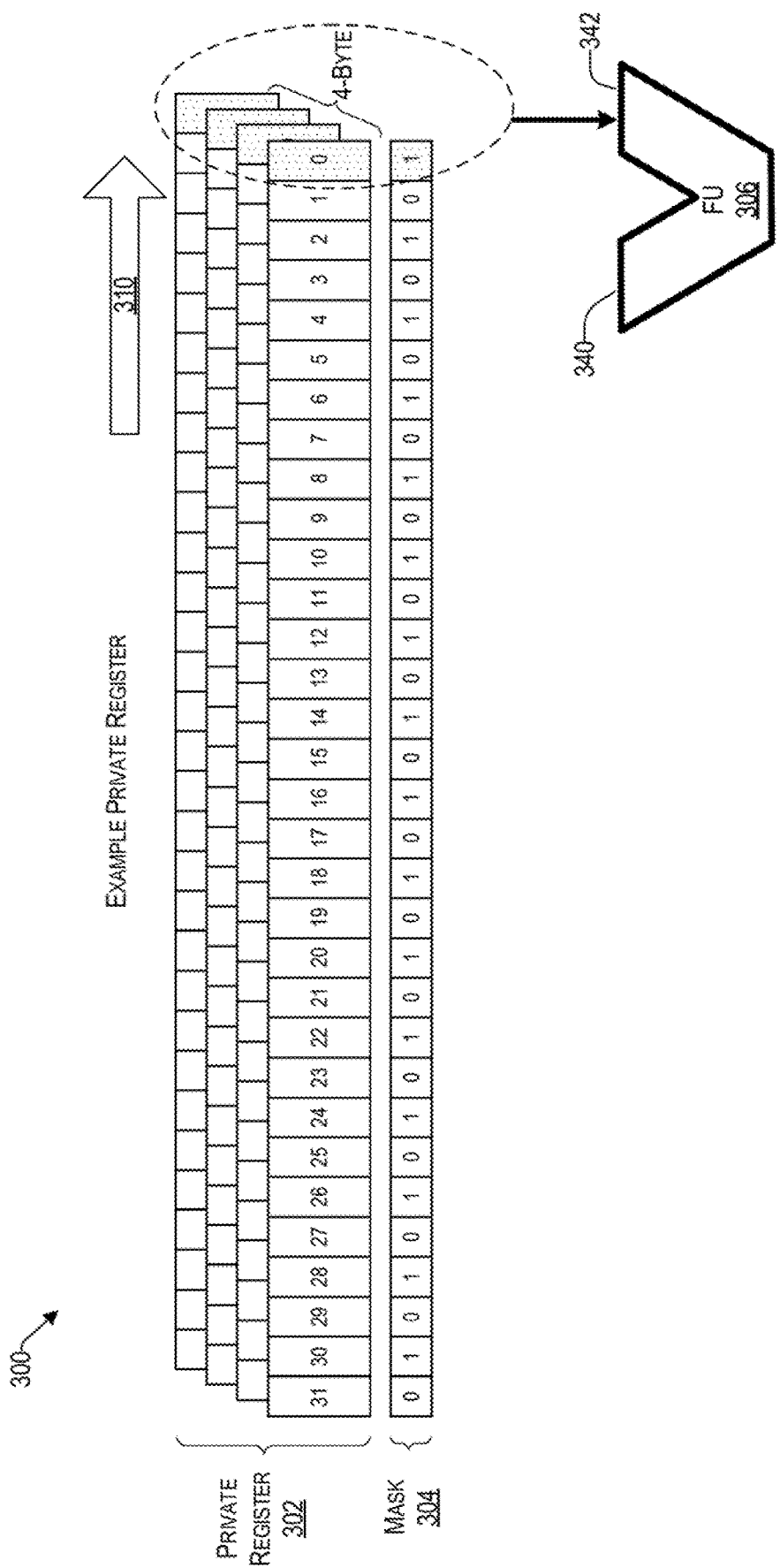
FIG. 3 is block diagram of an example private vector register and a mask register associated with a functional unit, consistent with an illustrative embodiment.

By way of example only, and not by way of limitation, each private vector register block of FIG. 2 has six registers. Registers 216(0:2) are input registers, register 214 is an output register, and register 212 is the mask register, while it will be understood that other configurations are supported as well. In one embodiment there is a register 218 to store the condition code bits generated by the functional unit (e.g., ALU) operations on each set of input elements. For example, condition code bits may be a result produced by an ALU being zero, negative, the floating-point number overflowing, etc. The mask register will be discussed in more detail with reference to FIG. 3.

Each of these register blocks (i.e., 204(0) to 204(P)) are private in the sense that a functional unit (e.g., 202(0)) can only access is dedicated private vector register block (e.g., 204(0)) and no other private vector registers (e.g., 204(1) to 204(P)). Thus, while all functional units (i.e., 202(0) to 202(P) have access to the shared vector registers, a private vector register block can only be accessed directly by its corresponding functional unit. In one embodiment, the input and output private vector registers of a private vector register block are 32×4 byte shift registers, while the mask 212 is 1 bit and the condition code registers 218 are a few (e.g., 4 bits). Stated differently, each shift register (e.g., 216(0:2)) includes 32 elements having 4 bytes. Each private vector register supports a parallel load from the shared vector registers 240 and a parallel store to the shared vector registers 240.

The shared vector registers 240 may have various configurations. By way of example only, and not by way of limitation, the shared vector registers 240 of FIG. 2 may represent an L1 cache data array comprising 128-byte vectors 241(0) to 241(M) shared across all functional units. In one embodiment, the number of vectors is 512 (i.e., M=511). These registers are shared in the sense that each of the plurality of functional units 202(0) to 202(P), via its corresponding private vector registers 204(0) to 204(P), has similar access to the shared vector registers 240.

For example, the private vector register file (e.g., 216(0)) is loaded in parallel (i.e., in one step) but is processed by the functional unit 202(0) one element at a time. In the example of FIG. 2, the term element represents 4 bytes, while it will be understood that other element sizes are supported as well.

Consider the situation where private vector register 226(1) of private memory block 204(1) associated with functional unit 202(1) needs data from the private vector register 214 of private memory block 204(0) associated with functional unit 202(0). There are two ways of accessing the data of private vector register 214 by private vector register 226(1). In one approach, functional unit 202(0) retrieves the data from its private vector register 214 and stores it in a shared vector register, such as the shared vector register 241(0) of the shared vector register block 240. Subsequently, functional unit 202(1) can read that data from the shared vector register 241(0) and store the same in its private vector register 226(1). However, such operation is relatively time consuming and resource intensive because it involves additional access to a shared resource, which can result in delays caused by contention at the shared resource.

In a second approach, the control unit 110, through control signals 172, sets up a direct connection from the output of functional unit 202(0) to an input, (e.g., the first input), of functional unit 202(1). Accordingly, the shared vector registers 240 are avoided in the second approach. By virtue of avoiding the shared vector registers 240, the overhead, time, and energy associated with communicating with the shared vector registers 240 is avoided, thereby substantially improving the data throughput of the computing system 200. This concept is further clarified in the context of timing diagrams discussed later.

Each functional unit 202(0) to 202(P) can perform an operation on multiple sets of data sequentially. The number of the data sets to be processed by each functional unit 202(0) to 202(P) is determined by the vector size (number of elements in a private vector register). In one embodiment, data is retrieved from a private vector register one element at a time to be process by the corresponding functional unit. Therefore, the time taken to sequentially process all the data from the private vector registers is based on the number of elements therein. For example, a functional unit uses 32 clock cycles to process the data in a 32-element private vector register. The data output from the functional unit is written to a private vector register associated therewith and/or sent to other functional units via the IFUDB 230.

The mask bit vector 212 controls if the operation is performed on a data set. In this regard, reference now is made to FIG. 3, which is block diagram 300 of an example private vector register 302 and a mask register 304 associated with a functional unit 306, consistent with an illustrative embodiment. By way of example only, and not by way of limitation, the private vector register 302 has 32 elements having four bytes per element. The data of the 32-element private vector register 302 is processed one element at a time, sequentially, by way of shift operation 310 from one element to another (i.e., from left to right in the example of FIG. 3). Each element is of predetermined byte length (e.g., 4 bytes in the present example). Thus, it would take the functional unit 306 32 cycles to process the 32 elements of the private vector register 302.

The mask vector 304 is a 32-bit register that indicates whether a particular element of the register 302 should undergo an operation or should be skipped by the functional unit 306. The mask has a same number of elements as the private vector register. For example, for element 0 of the private vector register, the mask is 1, indicating that the subject function should be performed by the functional unit 306. In contrast, for element 1 of the private vector register, the corresponding mask bit is "0" indicating that the operation of the functional unit 306 should not be performed. In such a scenario, the content of the private vector register 302 (for the particular element) is simply maintained. Thus, if the mask bit is "1" for an element, the operation is performed by the functional unit 306. However, if the mask bit is "0" for the element of the private vector register 302, the operation is not performed by the functional unit 306. In contrast to known processor cores, the functional unit 306 herein receives a single element of a private vector register at a time and not the entire contents of a vector register to be processed in a single step.

Consider, for example, the functional unit 306 having two operands (i.e., left 340 and right 342) and configured to perform an "add" operation between the left and right operands. Consider further that the contents of the private vector register 302 are 0 to 31 (shown right to left) and the input to the left operand be all 2's. If the mask 304 were all 1, the output would be 2, 3, 4, . . . 33. However, if the mask 304 were 1, 0, 1, 0 . . . , (shown right to left) then the output would be 2, 1, 4, 3, . . . 31.

Figures 4A, 4B:
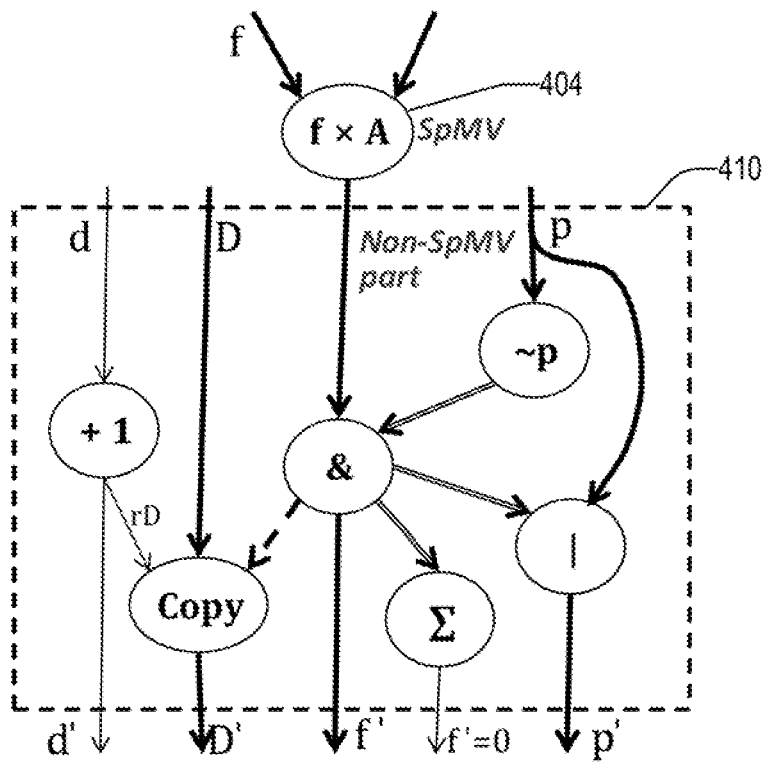
FIG. 4A represents an example function that can be implemented by a processor core, similar to that of FIG. 1.
FIG. 4B represents an example flow implemented by one or more functional units of a core, by way of interacting with memory through read write operations, based on the function of FIG. 4A.

Reference now is made to FIGS. 4A and 4B, which illustrate an example function and a conceptual block diagram 400B of a flow related to the function 400A, respectively, consistent with illustrative embodiments. More particularly, FIG. 4A represents an example function that can be implemented by a processor core, similar to that of core 104 of FIG. 1. FIG. 4B represents an example flow implemented by one or more functional units of the core, by way of interacting with memory through read write operations, based on the function 400A. The block 404 receives elements f and A and performs a sparse matrix-vector multiplication thereof using one or more functional units. Block 410 performs rest of the operations of FIG. 4A. The solid bold arrows in block 410 represent shared register reads and writes. The target of a shared register read or source of a shared register write operation is a private vector register. There are three reads to shared registers in block 410 labeled f″, D, and p, and three writes to shared registers labeled f′, D', and p'. The three hollow lines and the dashed lines represent four shared register write operations and the corresponding five shared read operations that can be avoided by chaining through an IFUDB. The dashed arrow indicates an input to a masked operation. The output vector chaining is further explained below.

Figure 5:
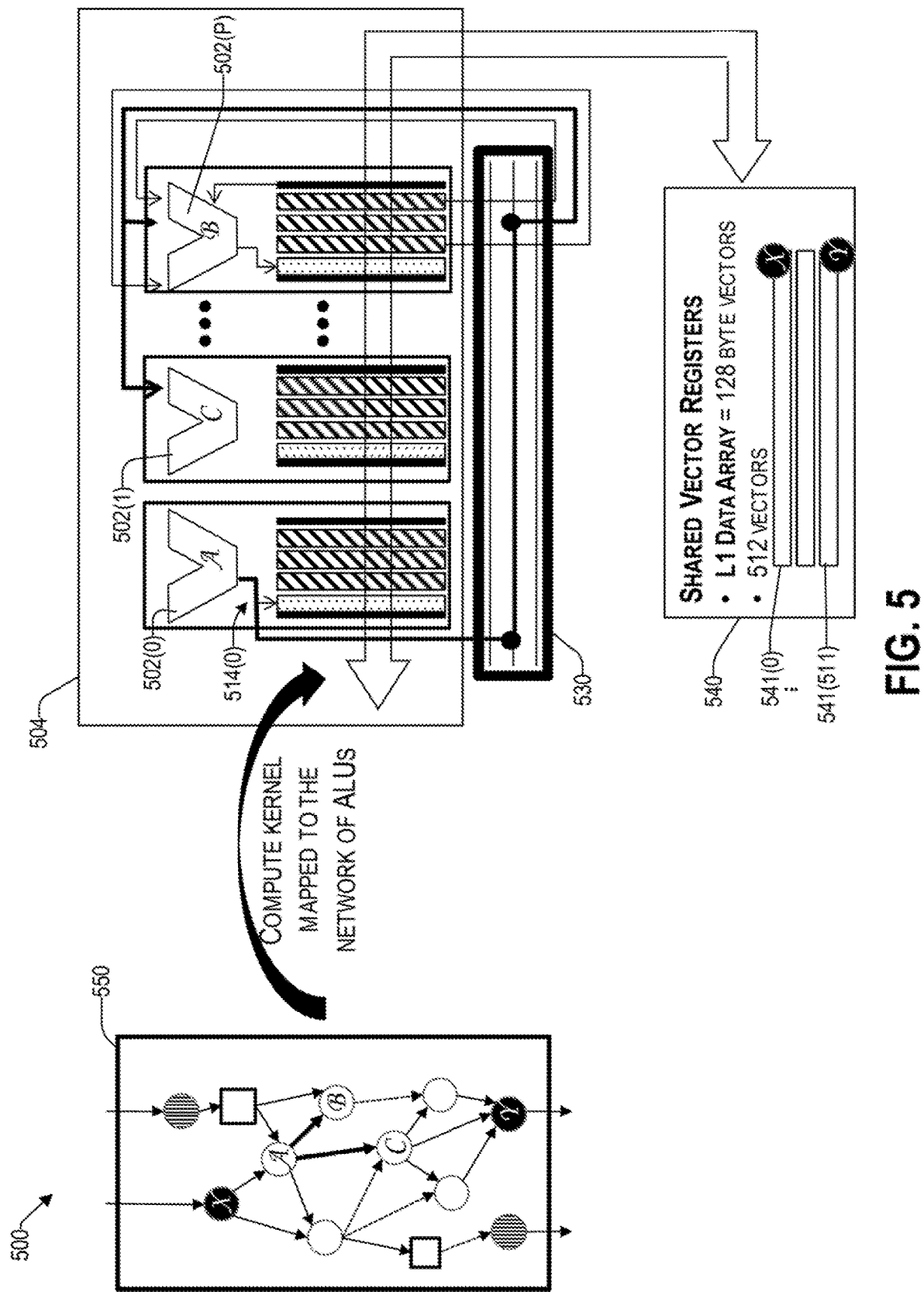
FIG. 5 is a conceptual block diagram of a function being implemented by a core of a processor by way of vector chaining, consistent with an illustrative embodiment.

FIG. 5 is a conceptual block diagram of a function 550 being implemented by a core 504 of a processor by way of vector chaining, consistent with an illustrative embodiment. The kernel 550 is a collection of nodes representing loops of an example cognitive and/or a high-performance computing (HPC) application. The hollow nodes in function 550 represent arithmetic operations. The square nodes represent the coalescing of data into unit stride vectors. The solid and patterned nodes represent loading/storing of vector data into/from private vector registers of execution units, sometimes referred to herein as functional units. By way of demonstrative example, the part of the compute kernel 550 with labeled hollow nodes is mapped to an example computing system that includes a core 504, an IFUDB 530, and shared vector registers 540.

For example, node A of kernel 550 is assigned to functional unit 502(0); node B is assigned to functional unit 502(P); and node C is assigned to functional unit 502(1). Further, node X of kernel 550 is represented by shared vector register 541(0) and node Y is represented by shared vector register 541(511) of the vector register bank 540.

The data of the shared vector register 541(0), which in this example is a 128-byte vector, is loaded in a single step by a private vector register of a private vector register block 514(0) of the functional unit A (502(0)). In one embodiment, the private vector register receiving this data is a 32×4 byte vector. This data is processed by the functional unit A (502(0)) and its output is stored in a private vector register of its corresponding private vector register block 514(0). Further, this output is routed by way of the IFUDB 530 directly to functional units B (502(P)) and C (502(1)). Significantly, the shared register block 540 is not used for the foregoing chaining of the output. Ultimately, the functional unit 502(1), upon completing of its data processing, can store its output in shared vector register Y (541(511)). Thus, 32 instances of the kernel 550 on 32 different and disjointed sets of data can be executed. The 32 instances indicate the repetition of the kernel, wherein each instance processes the successive data elements in the input vector registers. Each scalar data element consumed in one instance of the kernel maps to a 32-element vector for the 32 instances. One copy of instructions is sufficient to be dispatched by a controller to process all 32 copies of the data. By virtue of using the chaining feature of the IFUDB 530, memory access bandwidth and latency bottlenecks are alleviated.

Referring back to FIG. 1, by way of example, consider the control unit 110 receiving program instructions to implement a function, such as the multiply function below:

$$R_T \leftarrow \text{Miltiply}^x(R_{S1}, R_{S2})$$

In turn, the control unit 110 selects a functional unit (e.g., 106(0) to 106(31)) to execute the multiply operation above and sends control signals for data transfers between shared 108 and private vector register blocks 107(0) to 107(31). To facilitate the present discussion, the following nomenclature is adopted. The term $P^x$ indicates the private vector registers of functional unit x, chosen for the execution of the function above. The term R indicates the shared registers 108 that accessible by all functional units 106(0) to 106(31). The subscripts indicate register numbers (i.e., $R_{S1}$ is the source register for the first operand of the multiply instruction, and $R_T$ is the target register. Similarly, the term $P_{S1}^x$ is the private vector register of a functional unit x (e.g., 107(0)) used as source for the first operand of the multiply instruction, and $P_T^x$ is the target register of functional unit x (e.g., 107(0)). In one embodiment, there are three private source registers and one private destination register for each functional unit.

With the foregoing overview of the nomenclature, reference now is made to FIGS. 6A and 6B, which provide an example block diagram of a computing system 600A and the corresponding waveforms 600B, respectively, consistent with illustrative embodiments. The components of the computing system 600A are similar to those of computing system 200 of FIG. 2 and are therefore not discussed here in detail for brevity.

Each shared vector register of a shared vector register block 640 includes 32 elements (e.g., 128 bytes which can be divided into 32×4byte elements). Each register of a private vector register block (e.g., 614(0) to 614(31)) also includes 32 elements (e.g., 32×4 byte). The movement of all 32 elements between the shared registers 641(1) and 641(N), and private vector registers 616(0) and 616(1), respectively, occurs in one clock cycle, as illustrated by waveforms 652 and 654. Stated differently, there is a parallel transfer of data from the shared vector registers to the private vector registers. The functional unit x (602(1)) performs the multiply operation, consuming a source operand from each of its first two source registers 616(0) and 616(1), on each of the L elements of the two source registers 616(0) and 616(1) in L consecutive cycles, where L represents the number of elements in a private vector register (32 in the present example). Accordingly, the functional units access their private vector registers sequentially.

In one embodiment, the latency of the operation is one cycle. Thus, all L results of a functional unit are available after L cycles after commencement of the Multiply control signal 656 received from a control unit. If the functional unit takes multiple cycles to perform an operation (e.g., l cycles), and is pipelined to accept a new set of operands in every cycle, then the last control signal private_to_Shared($R_T$, $P_T^x$) 658 commences l-1 cycles after the end of the Multiply control signal.

Figure 6:
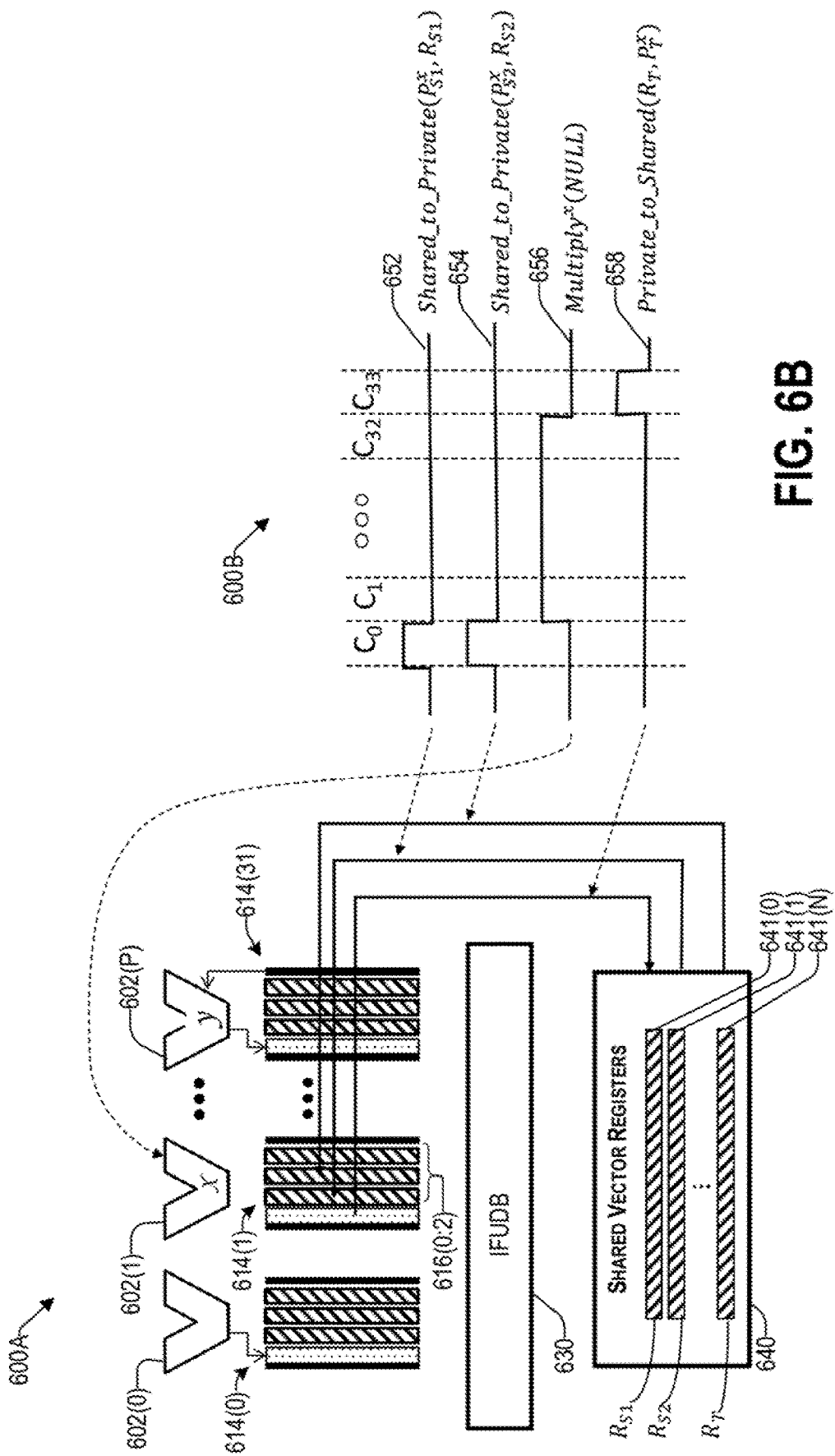
FIGS. 6A and 6B provide an example block diagram of a computing system and corresponding waveforms, respectively, consistent with illustrative embodiments.
Figure 7:
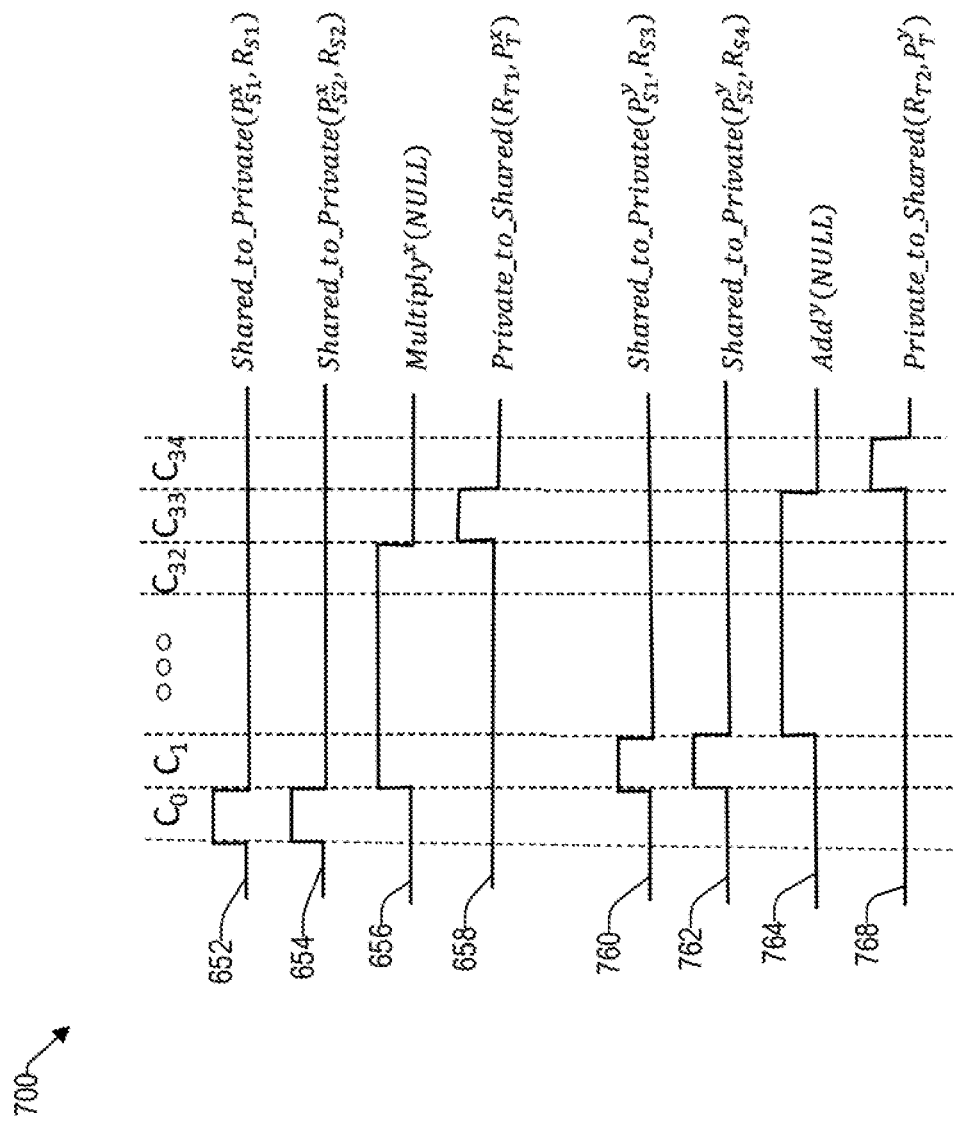
FIG. 7 describes an overlapped execution of multiple instructions, consistent with illustrative embodiments.

Reference now is made to FIG. 7, which describes an overlapped execution of multiple instructions, consistent with illustrative embodiments. More particularly, FIG. 7 provides waveforms 700 of an overlapped execution of multiple instructions by a microprocessor core. To facilitate this discussion, waveforms 700 will be described with reference to the block diagram 600 of FIG. 6A.

For example, when executing multiple program instructions concurrently, the transfer of the 32 elements of input operands for a first instruction from shared vector registers (e.g., 641(0) and 641(1)) to private vector registers 616(0:1) occurs in one clock cycle, as discussed above and illustrated by waveforms 652 and 654. However, input operands of a second instruction can be initiated on a different clock cycle, concurrently with the computation on operands for the first instruction, as illustrated by waveforms 760 and 762, which occur at clock cycle $C_1$, which is after clock cycle $C_0$, but before the completion of all the cycles 656 used for the first instruction. By way of example, consider the following two instructions from a control unit:

$$R_{T1} \leftarrow \text{Multiply}(R_{S1}, R_{S2})$$

$$R_{T2} \leftarrow \text{Add}(R_{S3}, R_{S4})$$

The control unit selects functional units x (602(1)) and y (602(P)) to execute the Multiply and Add operations above, respectively, and sends four control signals for each instruction, as described in the context of FIGS. 6A and 6B above and repeated by waveforms 652 to 658 in FIG. 7.

In various embodiments, the transfer of the L elements of data between a shared and a private vector register occurs in one clock cycle, two clock cycles, four clock cycles, and so on, represented herein by x cycles. Similarly, the functional units (602(0) to 602(P)) can process one, two or more elements per cycle, represented herein as y cycles, or even use multiple cycles (1/y) to process an element from their private vector registers. Accordingly, it would take a functional unit L/y cycles to process the full contents of its private register. The asymmetric rate of transfer is the difference between x and L/y.

In one aspect, the transfer of data between the shared 640 and private vector registers (614(0) to 614(31)) occurs in far fewer cycles than the number of cycles it takes for a functional unit to process the elements of a vector register (32 in the present example). Waveforms 760 to 768 illustrate that a new set of data (i.e., vector register) can be loaded from a shared vector register of a shared vector register block 640 to a private vector register (e.g., 614(31)), before the processing of another functional unit has completed its processing of its vector register. By virtue of the architecture of FIG. 6A, the shared register blocks of a shared register block 640 can be implemented more economically. For example, the complexity of the circuits surrounding the register file storage is proportional to the product of: (i) a number of distinct sources accessing the register file, and (ii) a number of concurrent accesses per cycle. In one aspect, the architecture herein reduces the number of accesses per cycle. For example, the economy of the architecture is manifest in each functional unit accessing the shared register file only 1/L times as often as it would have done if there were no private registers (e.g., assuming x=1 and y=1). Generally, the access of a functional unit to a shared register file is y/L as often based on the architecture discussed herein.

Figures 8A, 8B:
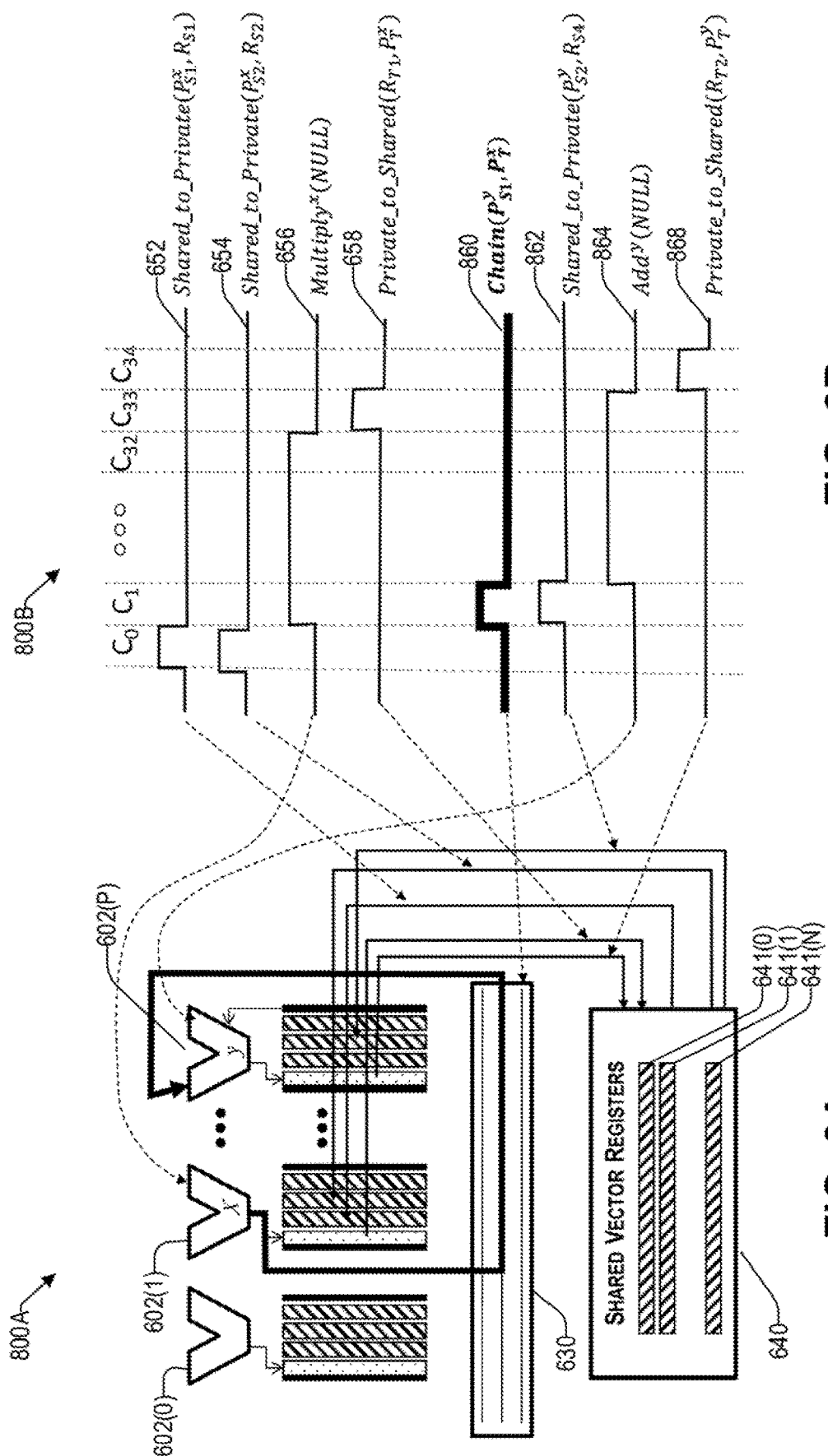
FIG. 8A provides a conceptual block diagram of a computing system that uses an inter functional unit data bypass block for chaining logic, consistent with an illustrative embodiment.
FIG. 8B are example waveforms based on the block diagram of FIG. 8A.

Reference now is made to FIGS. 8A and 8B, which provide an example block diagram of a computing system 800A configured to provide chaining and the corresponding waveforms 800B, respectively, consistent with illustrative embodiments. More particularly, FIG. 8A provides a conceptual block diagram of a computing system that uses an IFUDB block 630 for chaining logic and FIG. 8B provides and the corresponding waveforms 800B, respectively.

FIGS. 8A and 8B demonstrate two example instructions, namely a multiply and an add, similar to the operation of FIG. 7, with the main difference that the first operand of the second instruction is the target register of the first instruction. Stated differently, the IFUDB 630 is used to route the output of functional unit 602(1), one element per cycle, to the input of functional unit 602(P) without the use of the shared or private vector registers 640 starting after cycle $C_1$, as indicated by waveform 860. If there were no chaining, the execution of the second instruction would start after the first instruction places its result in the shared register $R_{T1}$. That is 34 cycles later from the start of the first instruction. Thus, the architecture of FIG. 8A allows relevant elements to be processed much earlier than conventional architectures that do not include private vector registers and an IFUDB 630.

Figure 9:
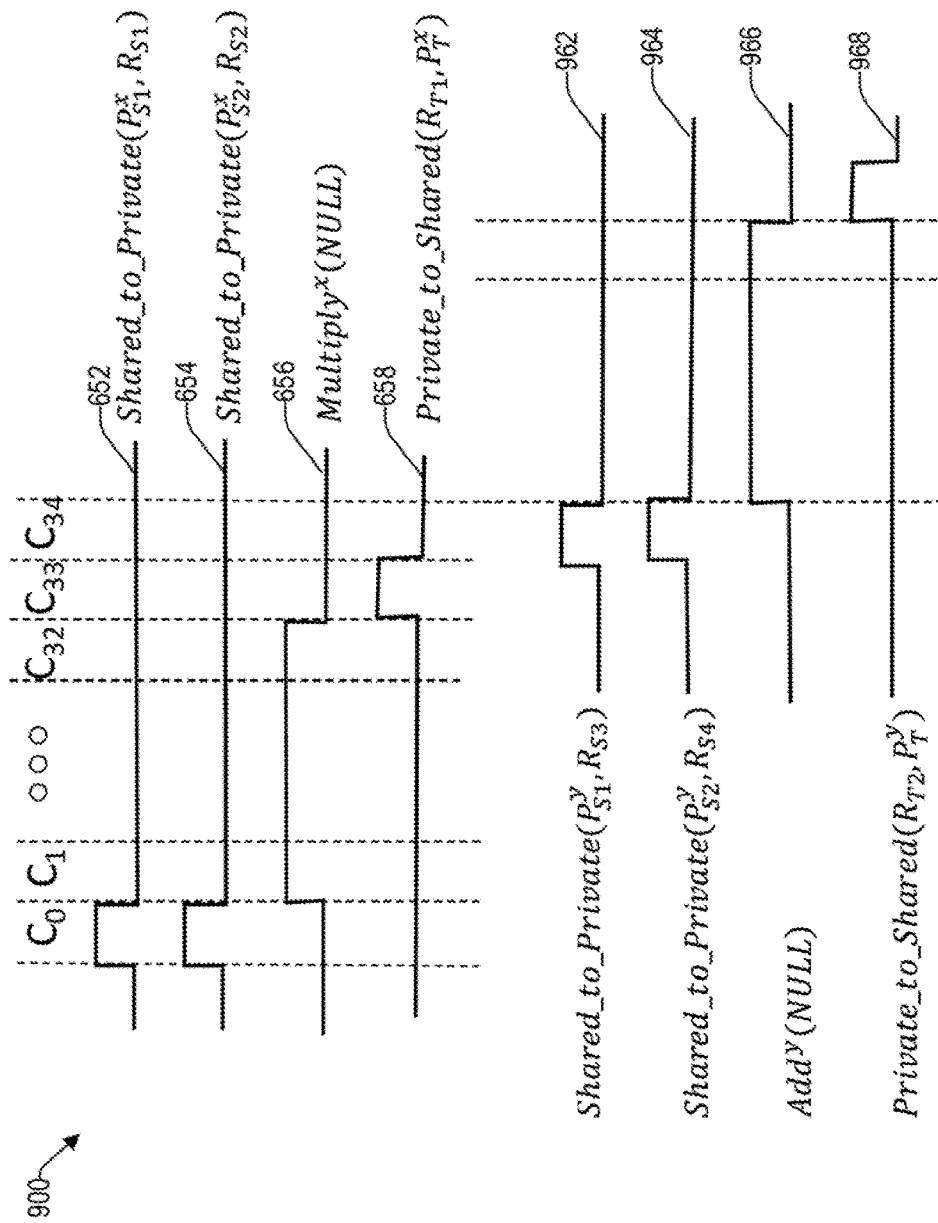
FIG. 9 illustrates waveforms that are delayed by until the processing of all the elements of a functional unit, consistent with an illustrative embodiment.

The chaining logic of the IFUDB 230 allows the second instruction to start as soon as the first instruction produces a result of the operation on the first element of its inputs, as illustrated in FIG. 8A. Waveform 860 (i.e., Chain($P_{S1}^y$, $P_T^x$)), shows a zero-latency coupling of the output produced by the functional unit x (602(1)). In contrast, in implementations that do not use the chaining discussed herein, the latency could be some non-zero delay m cycles, delaying the waveforms 864 and 868 by m+1 cycles, where m is the number of elements in a private vector register, in our example m=32. In this regard, FIG. 9 illustrates waveforms 962 to 968 that are similar to waveforms 860 to 868, except that they are delayed by 33 cycles (i.e., until the processing of all the elements is completed by functional unit x (602(1)). For example, the additional cycle, beyond m, is used to write the results of the first operation back to the shared register file.)

The chaining logic of the IFUDB 630 can be implemented in different ways. For example, the chaining logic may use a set of busses that can be used to route signals between the different functional units 602(0) to 602(P). The control signal from a control unit (i.e., Chain($P_{S1}^y$, $P_T^x$), causes a bus to be selected, the sending functional unit x (602(1)) to be coupled to this bus, and the receiving functional unit y (602(P)) to be also coupled to this bus.

Example Process

Figure 10:
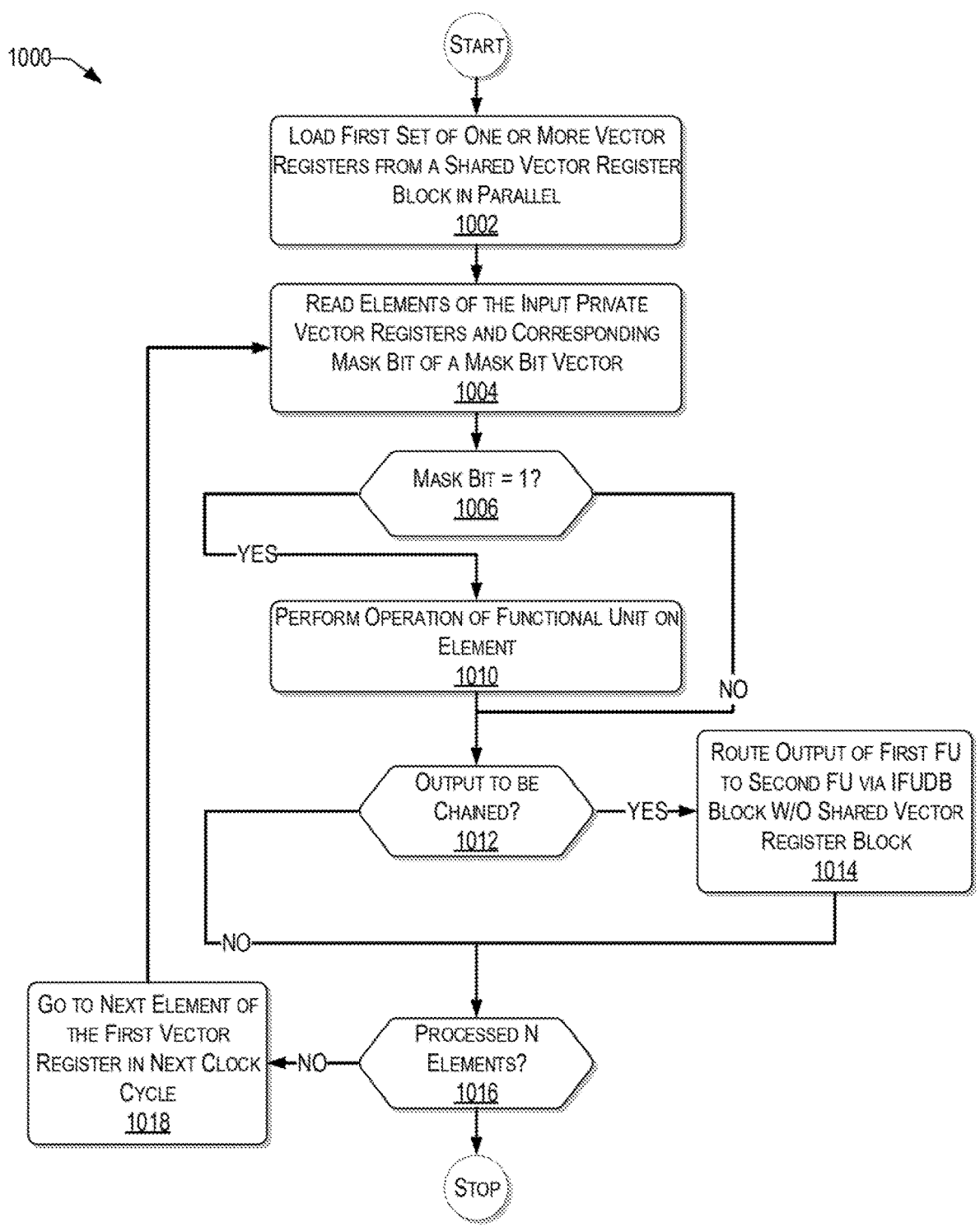
FIG. 10 presents an example process for processing data, consistent with an illustrative embodiment.

With the foregoing overview of the computer system 100 and the example scenarios of FIG. 4A/B, FIG. 5, FIG. 6A/B, FIG. 7, FIG. 8A/B, and FIG. 10, it may be helpful now to consider a high-level discussion of an example process. To that end, FIG. 10 presents an illustrative process 1000 for processing data by a computing system. Process 1000 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 1000 is described with reference to the block diagram 600 of FIG. 6.

At block 1002, a set of vector registers (e.g., 641(0), 641(1)) having N elements each is loaded from a vector register block 640 that is shared between a plurality of functional units 602(0) to 602(P) of a processor, in parallel, into a private vector registers 616(0:1) of a first functional unit 602(1) of the plurality of functional units. These are input operands for the operation to be performed by the functional unit 602(1). For example, up to three operands and two mask registers can be provided. Block 1002 is performed in a first clock cycle $C_o$ (652).

At block 1004, a first element of the N elements of the first vector register 641(1) is read by the first functional unit (e.g., 602(1)). In one embodiment, a first mask bit of a mask vector register of the first private vector block is read concurrently (i.e., in the same clock cycle $C_o$).

At block 1006 a control unit of the processor determines whether an operation, such as add, subtract, multiply, etc., should be applied to the first element. For example, if the mask bit for the subject element is "1" (i.e., "YES" at decision block 1006), the process continues with block 1010, where the operation is performed by the functional unit on the element. However, if the mask bit for the subject element is "0" (i.e., "NO" at decision block 1006), then the process continues with decision block 1012, At block 1012, a determination is made whether an output of the functional unit for the particular element should be chained to an input of another functional unit. If so (i.e., "YES" at decision block 1012), the process continues with block 1014, where the output of the first functional unit is routed to a second functional unit via an IFUDB block 630, without using the shared vector register block. However, upon determining that the output is not to be chained to another functional unit (i.e., "NO" at decision block 1012), the process continues with block 1016.

At block 1016, a determination is made whether all N elements of the private vector register have been processed. If not (i.e., "NO" at decision block 1016), the control unit initiates a serial shifting of the next element of the private vector register to the first functional unit 602(1) in a next clock cycle (e.g., cycles subsequent to $C_1$ in FIG. 6B, up to and including cycle $C_{32}$). The process then returns to block 1004 where a next element of the N elements of the first vector register 641(1) is read by the first functional unit 602(1).

However, upon determining that all N elements of the private vector register 616(0) have been processed (i.e., "YES" at decision block 1016), the control unit initiates a storing of the data of a private output vector register dedicated to the first functional unit to a shared vector register (e.g., 641(0)), thereby making the first functional unit (e.g., 602(1)) available for a new vector register to process.

Accordingly, each of the N elements of the private vector register 616(0) are processed by the functional unit 602(1), in series, on different clock cycles. For example, for a 32-element private vector register, it would take 32 clock cycles to process all the elements therein by the functional unit. Each element of the output can be chained to an input of another functional unit. The resulting output vector register can be stored in parallel in a single clock cycle to a shared vector register.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing system, comprising:
   a plurality of functional units, each functional unit having one or more inputs and an output;
   a private memory block assigned to each of the plurality of functional units; and
   a shared memory block coupled to private memory block of each of the plurality of functional units.

2. The computing system of claim 1, further comprising an inter functional unit data bypass (IFUDB) block coupled to the plurality of functional units, wherein the IFUDB is configured to route signals between the one or more functional units without use of the private or shared memory blocks.

3. The computing system of claim 2, further comprising a control unit configured to:
   receive an operation sequence from a program; and
   send control signals to at least one of the one or more functional units and the IFUDB to orchestrate the routing of data between the one or more functional units without use of the private or shared memory block, based on the operation sequence.

4. The computing system of claim 2, wherein the IFUDB is configured to forward results from one functional unit to another functional unit of the plurality of functional units, without use of the shared register block and without waiting for all elements of a vector register to be computed.

5. The computing system of claim 1, wherein:
   the shared memory block comprises one or more shared vector registers; and
   the private memory block comprises a plurality of private vector registers.

6. The computing system of claim 5, wherein the private vector registers and the shared vector registers each have a same number of elements.

7. The computing system of claim 6, wherein each functional unit is configured to process one element at a time from a private vector register of its assigned private memory block, for each clock cycle.

8. The computing system of claim 6, wherein, each of the private vector registers is configured to load all elements of a shared vector register in one clock cycle in parallel from the shared register block.

9. The computing system of claim 1, wherein the plurality of functional units and their corresponding private memory blocks are part of a central processing unit (CPU) core of the computing system.

10. The computing system of claim 1, wherein the functional units are configured to perform arithmetic, logic, load, and store operations.

11. The computing system of claim 1, wherein:
    each private memory block comprises a mask vector register, an output private vector register, and one or more input private vector registers;
    the shared memory block comprises one or more shared vector registers; and
    the input and output private vector registers each have a same number of elements as the shared vector registers.

12. A method of processing data, comprising:
    loading a first vector register having N elements from a vector register block that is shared between a plurality of functional units of a processor, in parallel, into a private vector register of a first functional unit of the plurality of functional units, in a first clock cycle;
    processing each of the N elements of the private vector register by the functional unit, in series, on different clock cycles; and
    routing an output of the first functional unit to a second functional unit via an inter functional unit data bypass (IFUDB) block, without using the shared or private vector register block.

13. The method of claim 12, wherein the output of the first functional unit is routed to the second functional unit at a clock cycle before completing the processing of all of the N elements of the private vector register of the first functional unit.

14. The method of claim 13, further comprising: loading a third vector register from the vector register block that is shared between the plurality of functional units of the processor, in parallel into a second private vector register of the second functional unit, at the clock cycle before completing the processing of all of the N elements of the private vector register of the first functional unit.

15. The method of claim 12, further comprising: storing an output of the first functional unit to a shared vector register in one clock cycle, in parallel, upon processing the N elements of the private vector register.

16. The method of claim 12, wherein the processing of the N elements of the private vector register is on consecutive clock cycles.

17. The method of claim 12, further comprising, loading a second vector register from the vector register block that is shared between the plurality of functional units of the processor, in parallel into a second private vector register of the first functional unit in the first clock cycle.

18. The method of claim 12, wherein processing each of the N elements of the private vector register by the functional unit comprises, for each of the N elements, determining whether the first functional unit is to perform an operation, based on a mask vector register.

19. The method of claim 18, wherein the mask vector register is loaded in the first clock cycle.

20. The method of claim 12, wherein the private vector registers and the shared vector registers each have a same number of elements.

* * * * *